US011168821B2

(12) United States Patent
Pappalardo

(10) Patent No.: US 11,168,821 B2
(45) Date of Patent: Nov. 9, 2021

(54) ADAPTERS FOR CONNECTING A SEPARATED-OUTLET FLUID CARTRIDGE TO A SINGLE-INLET MIXER, AND RELATED METHODS

(71) Applicant: Nordson Corporation, Westlake, OH (US)

(72) Inventor: Matthew E. Pappalardo, Ewing, NJ (US)

(73) Assignee: Nordson Corporation, Westlake, OH (US)

( * ) Notice: Subject to any disclaimer, the term of this patent is extended or adjusted under 35 U.S.C. 154(b) by 201 days.

(21) Appl. No.: 16/361,211

(22) Filed: Mar. 22, 2019

(65) Prior Publication Data

US 2019/0219208 A1 Jul. 18, 2019

Related U.S. Application Data

(62) Division of application No. 14/995,252, filed on Jan. 14, 2016, now Pat. No. 10,281,074.

(51) Int. Cl.
*B05C 17/005* (2006.01)
*F16L 37/10* (2006.01)
*F16L 39/00* (2006.01)

(52) U.S. Cl.
CPC ...... *F16L 37/101* (2013.01); *B05C 17/00506* (2013.01); *B05C 17/00509* (2013.01);
(Continued)

(58) Field of Classification Search
CPC .. F16L 37/101; F16L 39/00; B05C 17/00506; B05C 17/00509; B05C 17/00553; Y10T 29/49826
See application file for complete search history.

(56) References Cited

U.S. PATENT DOCUMENTS 5,228,599 A * 7/1993 Keller ............... B05C 17/00513
222/137
5,330,079 A 7/1994 Keller
(Continued)

FOREIGN PATENT DOCUMENTS

DE 3018438 A1 11/1981
DE 202006004738 U1 6/2006
(Continued)

OTHER PUBLICATIONS

International Patent Application No. PCT/US2017/012416: International Search Report and The Written Opinion dated Apr. 3, 2017, 13 pages.
(Continued)

*Primary Examiner* — Ryan J. Walters
(74) *Attorney, Agent, or Firm* — BakerHostetler

(57) ABSTRACT

An adapter for connecting a separated-outlet fluid cartridge to a single-inlet static mixer includes a locking portion and a connecting portion. The locking portion has at least one locking element to lockingly engage the mixer housing so as to inhibit rotation between the locking portion and the housing. The connecting portion is received within the locking portion and has first and second fluid inlet members to be coupled to respective first and second fluid outlets of the cartridge for receiving fluid from the cartridge, and a fluid outlet member is sealingly coupled to the mixer for directing fluid into the mixer. The locking portion is selectively rotatable about the connecting portion between unlocked and locked positions relative to the cartridge when the connecting portion is coupled to the cartridge. Consequently, the adapter advantageously enables dispensing with a separated-outlet fluid cartridge in combination with a single-inlet static mixer.

17 Claims, 14 Drawing Sheets

(52) U.S. Cl.
CPC ........ *B05C 17/00553* (2013.01); *F16L 39/00* (2013.01); *Y10T 29/49826* (2015.01)

(56) References Cited

U.S. PATENT DOCUMENTS

| | | | |
|---|---|---|---|
| 5,333,760 | A | 8/1994 | Simmen |
| 5,413,253 | A | 5/1995 | Simmen |
| 5,609,271 | A | 3/1997 | Keller et al. |
| 5,918,772 | A | 7/1999 | Keller et al. |
| 5,924,600 | A | 7/1999 | Keller |
| 6,135,631 | A | 10/2000 | Keller |
| 6,161,730 | A * | 12/2000 | Heusser ............ B05C 17/00506 222/137 |
| 6,186,363 | B1 | 2/2001 | Keller et al. |
| 6,527,203 | B2 | 3/2003 | Hurray et al. |
| 6,769,574 | B1 | 8/2004 | Keller |
| 6,820,766 | B2 | 11/2004 | Keller et al. |
| 8,376,187 | B2 | 2/2013 | Keller |
| 8,672,188 | B2 | 3/2014 | Rotz et al. |
| 9,010,578 | B2 | 4/2015 | Keller |
| 9,138,772 | B2 | 9/2015 | Pappalardo |
| 9,289,797 | B2 | 3/2016 | Pappalardo |
| 2001/0004082 | A1 | 6/2001 | Keller et al. |
| 2005/0230422 | A1 | 10/2005 | Muller et al. |
| 2006/0027605 | A1 | 2/2006 | Beckett et al. |
| 2008/0029542 | A1 | 2/2008 | Keller |
| 2008/0128454 | A1 | 6/2008 | Beckett |
| 2010/0012210 | A1 | 1/2010 | Miyano et al. |
| 2010/0102088 | A1 | 4/2010 | Keller |
| 2010/0200614 | A1 | 8/2010 | Von et al. |
| 2011/0121035 | A1 | 5/2011 | Greter et al. |
| 2011/0151402 | A1 | 6/2011 | An |
| 2011/0198370 | A1 | 8/2011 | Ho et al. |
| 2011/0273956 | A1 | 11/2011 | Sasan et al. |
| 2012/0199607 | A1 | 8/2012 | Keller |
| 2013/0021870 | A1 | 1/2013 | Linne et al. |
| 2013/0135963 | A1 | 5/2013 | Linne et al. |
| 2013/0265846 | A1 | 10/2013 | Bublewitz et al. |
| 2014/0110435 | A1 | 4/2014 | Pappalardo |
| 2014/0117044 | A1 | 5/2014 | Pappalardo |
| 2014/0124536 | A1 | 5/2014 | Pappalardo |

FOREIGN PATENT DOCUMENTS

| | | |
|---|---|---|
| EP | 0099706 A2 | 2/1984 |
| EP | 1029585 A1 | 8/2000 |
| EP | 1125641 A1 | 8/2001 |
| EP | 2407249 A1 | 1/2012 |
| JP | 09-136023 A | 5/1997 |
| JP | 11-099325 A | 4/1999 |
| JP | 2000-126569 A | 5/2000 |
| JP | 2010-184234 A | 8/2010 |
| JP | 2011-125676 A | 6/2011 |
| JP | 2012-520094 A | 9/2012 |
| JP | 2013-111574 A | 6/2013 |
| JP | 2014-087790 A | 5/2014 |
| JP | 2014-091123 A | 5/2014 |

OTHER PUBLICATIONS (IPEA/409) International Preliminary Report on Patentability Chapter II or (IB/373) International Preliminary Report on Patentability Chapter I dated Jul. 26, 2018 for WO Application No. PCT/US17/012416.

* cited by examiner

ADAPTERS FOR CONNECTING A SEPARATED-OUTLET FLUID CARTRIDGE TO A SINGLE-INLET MIXER, AND RELATED METHODS

CROSS REFERENCE TO RELATED APPLICATIONS

This application is a continuation of U.S. patent application Ser. No. 14/995,252, filed Jan. 14, 2016, and published as U.S. Patent App. Pub. No. 2017/0205009 on Jul. 20, 2017, the disclosure of which is hereby incorporated by reference herein.

TECHNICAL FIELD

The present invention relates generally to fluid dispensers, and more particularly, to structures and methods for connecting static mixers to fluid cartridges.

BACKGROUND

In the dispensing field, it is common practice to manufacture and ship fluid cartridges holding fluid to be dispensed separately from static mixers for mixing the fluid. There are various reasons for this practice, including, but not limited to, the extensive length of some mixer/cartridge combinations when connected, and the desire to use a plurality of different mixers with a particular cartridge. Consequently, mixers and cartridges are often provided with connection elements that facilitate secure coupling of a mixer to a cartridge.

A common type of cartridge used in the dispensing field is a multi-component (or "side-by-side") cartridge having two or more separate chamber portions each adapted to contain a respective fluid. Such cartridges often include separated first and second fluid outlet members that are coupled to separated first and second fluid inlet members of a mixer when the mixer is attached to the cartridge. Such cartridges and mixers may be referred to as "separated-outlet" cartridges and "separated-inlet" mixers, or more generally as "separated-bore" dispensing components. Further, such cartridges and mixers often include bayonet-style connection elements. For example, the mixer may include a pair of bayonet lugs, and the cartridge may include one or more locking channels that receive and lockingly engage the bayonet lugs when the mixer is rotated relative to the cartridge.

In addition to separated-bore dispensing components, non-separated-bore components, also referred to as "single-bore" or "single-inlet" components, for example, are also commonly used in the dispensing field. A single-inlet, or single-bore, mixer generally includes a single fluid inlet rather than separated first and second fluid inlet members, and thus is designed for use with a cartridge having a single fluid outlet member. Users of dispensing components often maintain inventories of separated-bore dispensing components and/or single-bore dispensing components. For such users, it may be desirable for various business and product quality reasons to use single-bore mixers (i.e., single-inlet mixers) with separated-bore cartridges. However, the structural differences between single-bore mixers and separated-bore cartridges generally inhibit their use together.

Accordingly, there is a need for a mechanism that enables use of single-inlet (i.e., single-bore) mixers with separated-outlet (i.e., separated-bore) cartridges.

SUMMARY

According to an exemplary embodiment of the invention, an adapter for connecting a separated-outlet cartridge containing a fluid to a single-inlet mixer configured to mix and dispense the fluid includes a locking portion and a connecting portion. The locking portion has at least one locking element configured to lockingly engage a housing of the mixer so as to inhibit rotation between the locking portion and the housing. The connecting portion is received within the locking portion and has first and second fluid inlet members configured to be coupled to respective first and second fluid outlets of the cartridge for receiving fluid from the cartridge. The connecting portion further includes a fluid outlet member configured to be sealingly coupled to the mixer for directing fluid into the mixer. The locking portion is rotatable about the connecting portion between an unlocked position relative to the cartridge and a locked position relative to the cartridge when the connecting portion is coupled to the cartridge.

In another exemplary embodiment of the invention, a method of assembling a dispensing assembly having a single-inlet mixer and an adapter having a locking portion and a connecting portion includes positioning a proximal end of the mixer within a distal opening of the locking portion. The mixer is lockingly engaged with the locking portion so as to inhibit rotation between the mixer and the locking portion. The method further includes arranging the connecting portion within the locking portion such that a fluid outlet member of the connecting portion extends toward the distal opening of the locking portion and first and second fluid inlet members of the connecting portion extend toward a proximal opening of the locking portion. The method further includes sealingly engaging the fluid outlet member of the connecting portion with an inlet of the mixer.

Various additional features and advantages of the invention will become more apparent to those of ordinary skill in the art upon review of the following detailed description of one or more illustrative embodiments taken in conjunction with the accompanying drawings.

DETAILED DESCRIPTION

Figure 1:
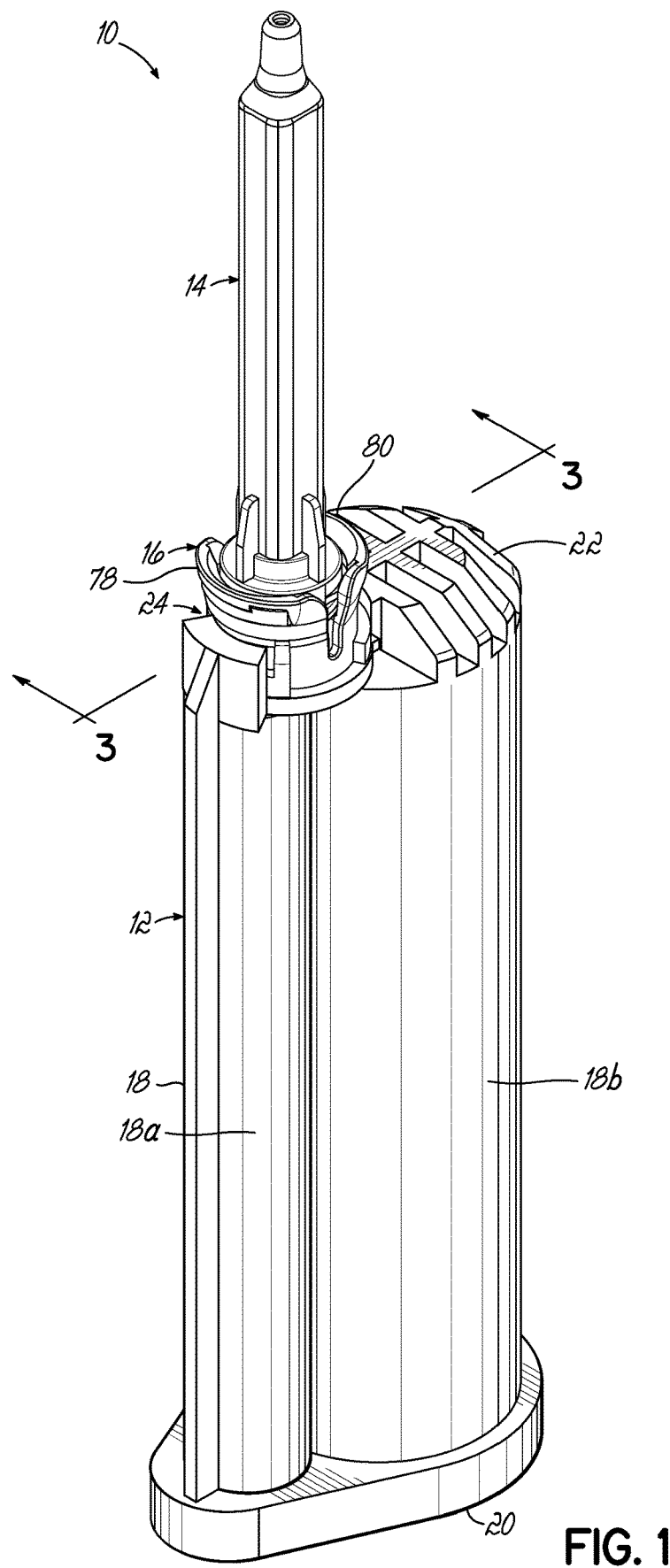
FIG. 1 is a perspective view of a dispensing assembly including a separated-outlet fluid cartridge, a single-inlet mixer, and an adapter for connecting the cartridge to the mixer according to an exemplary embodiment of the invention.

Referring to the Figures, and beginning with FIG. 1, a dispensing assembly 10 according to an exemplary embodiment of the invention is shown. The dispensing assembly 10 generally includes a separated-outlet cartridge 12, a single-inlet static mixer 14, and an adapter 16 that releasably couples the static mixer 14 with the cartridge 12.

The adapter 16 advantageously enables use of a single-inlet static mixer 14 with a separated-outlet cartridge 12 for dispensing operations, whereas such mixers and cartridges are otherwise generally incompatible with one another. Moreover, the adapter 16 lockingly engages the static mixer 14, such as through a snap fit engagement, and selectively and releasably engages the cartridge 12. Advantageously, the static mixer 14 and adapter 16 may be preassembled and shipped to users for attachment to and use with existing supplies of separated-outlet cartridges, such as cartridge 12.

As used herein, for example in connection with separated-outlet cartridge 12, the terms "separated-outlet," "separated-inlet," and "separated-bore" refer to dispensing components having first and second fluid outlet/inlet members (also referred to as "ports"), each defining a respect fluid outlet/inlet passage and having a respect sealing surface for sealingly engaging a corresponding fluid inlet/outlet member of another dispensing component. As described in greater detail below, separated-outlet cartridge 12 includes a first fluid outlet member defining a first fluid outlet passage and having a first fluid outlet sealing surface, and a separate second fluid outlet member defining a second fluid outlet passage and having a second fluid outlet sealing surface.

Further, as used herein, for example in connection with single-inlet static mixer 14, the terms "single-inlet" and "single-bore" refer to dispensing components having a single fluid inlet or bore defining a corresponding single fluid passage and having a single sealing surface for sealingly engaging a corresponding member of another dispensing component. As described in greater detail below, single-inlet static mixer 14 includes a single fluid inlet defining a single fluid inlet passage and having a single fluid inlet sealing surface.

Figure 2:
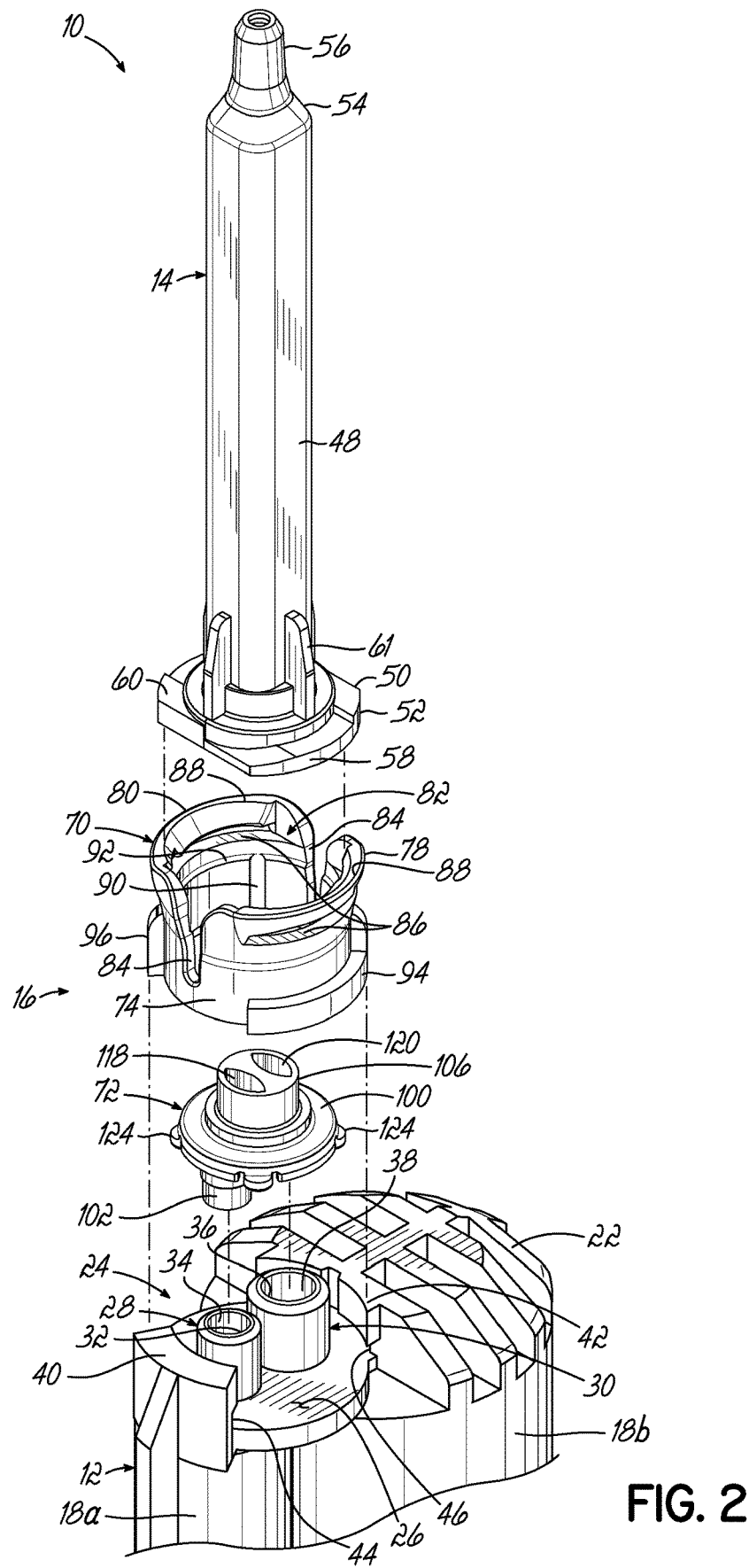
FIG. 2 is a perspective view of the dispensing assembly of FIG. 1, shown disassembled.

Referring to FIGS. 1 and 2, the separated-outlet cartridge 12 includes a fluid chamber 18 that extends between a proximal end 20 and a distal end 22 of the cartridge 12. The fluid chamber 18 includes first and second fluid chamber portions 18a, 18b arranged adjacent to one another. The fluid chamber portions 18a, 18b are configured to contain first and second fluids, respectively, to be mixed together before dispensing, such as two reactive components that mix to form an adhesive material.

Although the first and second fluid chamber portions 18a, 18b are shown with differing sizes in the Figures, it will be understood that the fluid chamber portions 18a, 18b may be resized relative to one another in other embodiments consistent with the invention. Moreover, the fluid chamber 18 may include more or fewer fluid chamber portions in other embodiments without departing from the invention. As well understood in the dispensing field, the proximal end 20 of the cartridge 12 is configured to receive an actuator (not shown) such as a pneumatically or mechanically actuated piston for pushing the fluids out of the fluid chamber 18 and into the static mixer 14.

As best shown in FIG. 2, the distal end 22 of the separated-outlet cartridge 12 includes an outlet socket 24 configured for connecting to a separated-inlet mixer (not shown). The outlet socket 24 includes a landing surface 26 and first and second fluid outlet members 28, 30 (also referred to as outlet "ports") extending distally from the landing surface 26 and arranged adjacent to one another. The first fluid outlet member 28 defines a first fluid outlet passage 32 that communicates with the first fluid chamber portion 18a, and which has a first inner sealing surface 34. The second fluid outlet member 30 defines a second fluid outlet passage 36 that communicates with the second fluid chamber portion 18b, and which has a second inner sealing surface 38. While the fluid outlet members 28, 30 are shown as differently sized tubular members having substantially circular cross-sectional shapes, it will be appreciated that the fluid outlet members 28, 30 may be formed with various alternative shapes and with various alternative sizing.

The outlet socket 24 further includes first and second fingers 40, 42 extending distally from diametrically opposed sides of the landing surface 26. The first and second fingers 40, 42 may extend partially circumferentially about the first and second fluid outlet members 28, 30, and overhang the landing surface 26 to define respective first and second locking channels 44, 46 configured for lockingly engaging bayonet lugs 58, 60 formed on a static mixer 14. As described in greater detail below, the adapter 16 is advantageously provided with bayonet lugs 94, 96 for releasably engaging a fluid cartridge, thereby facilitating connection of a single-inlet static mixer with a separated-outlet fluid cartridge, such as cartridge 12 and static mixer 14, for example.

Figure 3A:
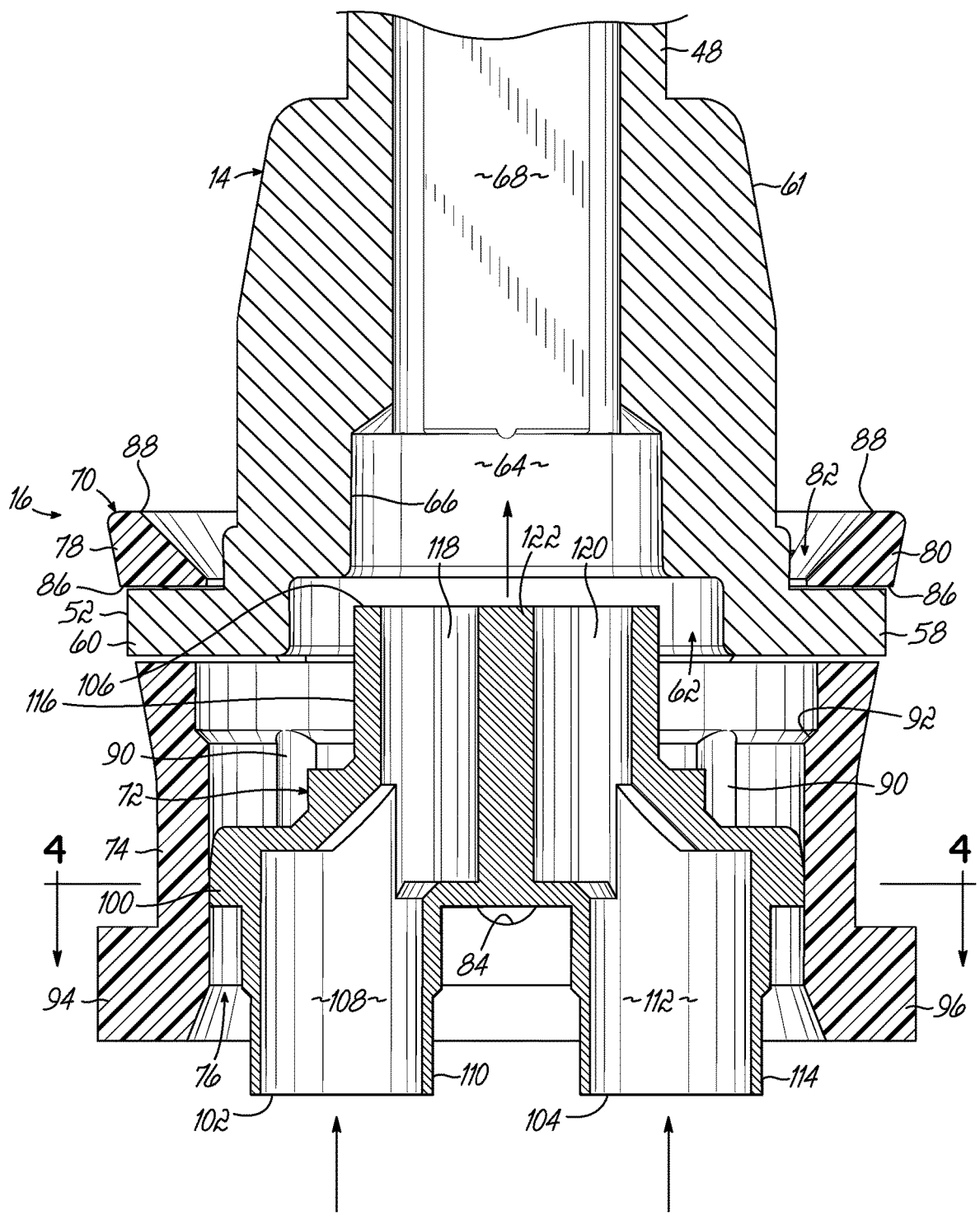
FIG. 3A is a side cross-sectional view of the dispensing assembly of FIG. 1, taken along line 3-3, showing assembly of a connecting portion and a locking portion of the adapter.

Referring to FIGS. 2 and 3A, the single-inlet static mixer 14 includes a mixer housing 48 extending between a proximal end 50 having a mixer flange 52 and a distal end 54 having a dispensing tip 56. The mixer flange 52 includes first and second L-shaped bayonet lugs 58, 60 extending radially outward from generally opposite sides of the mixer flange 52. The mixer housing 48 generally houses a mixing elements (not shown) having one or more known mixing baffles of various types for rotating and combining one or more fluids together as the fluid(s) traverse the length of the mixer housing 48. One or more reinforcement ribs 61 may be arranged circumferentially about the mixer flange 52 and extend distally from the proximal end 50. As best shown in FIG. 3A, the static mixer 14 includes a single fluid inlet 62 defining a single fluid inlet passage 64 and having a single inner sealing surface 66. The fluid inlet passage 64 opens to a central bore 68 in which the mixing element (not shown) is arranged.

Figure 3B:
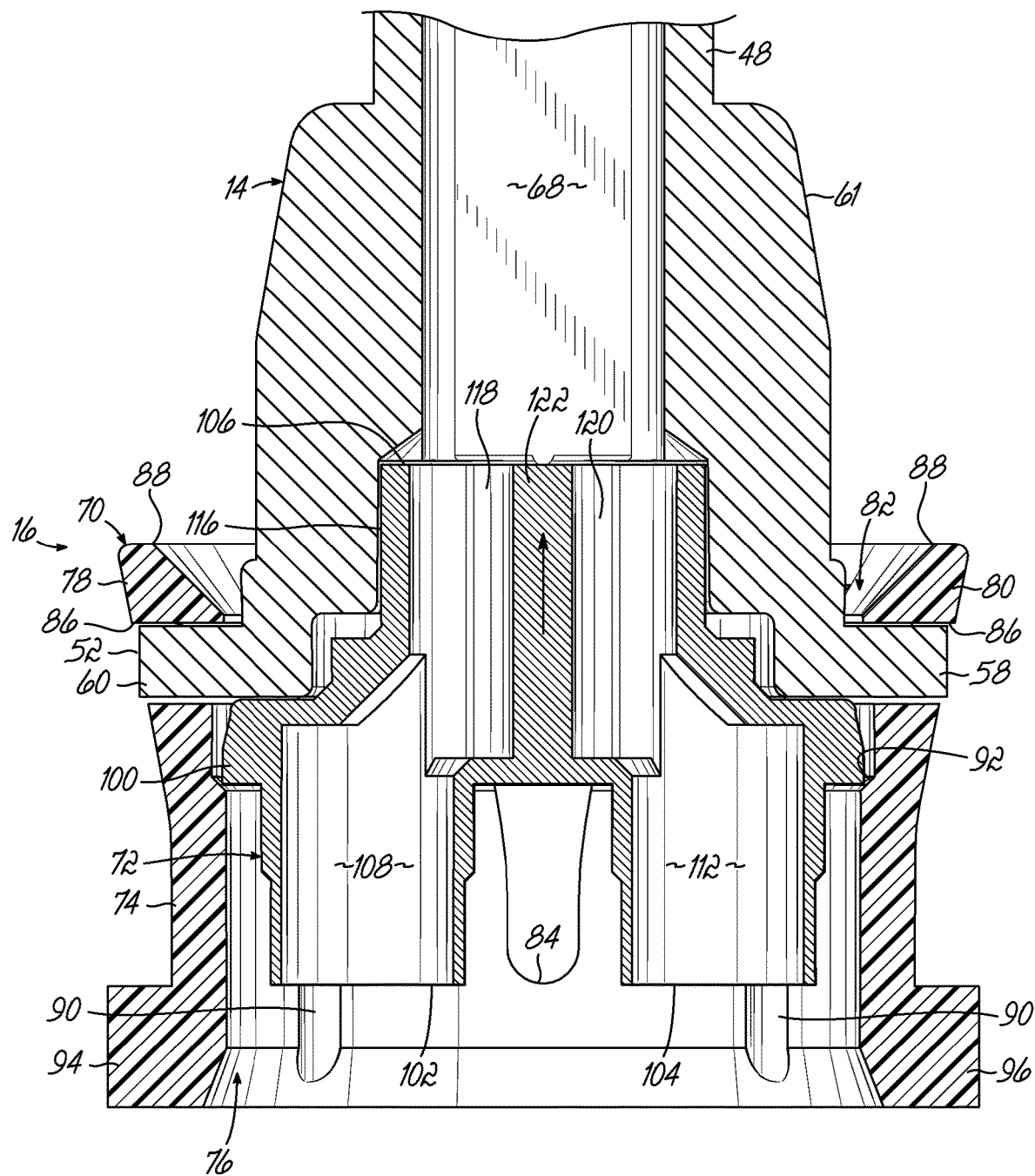
FIG. 3B is a side cross-sectional view similar to FIG. 3A, showing the adapter in assembled form and fully engaged with the mixer.
Figure 4:
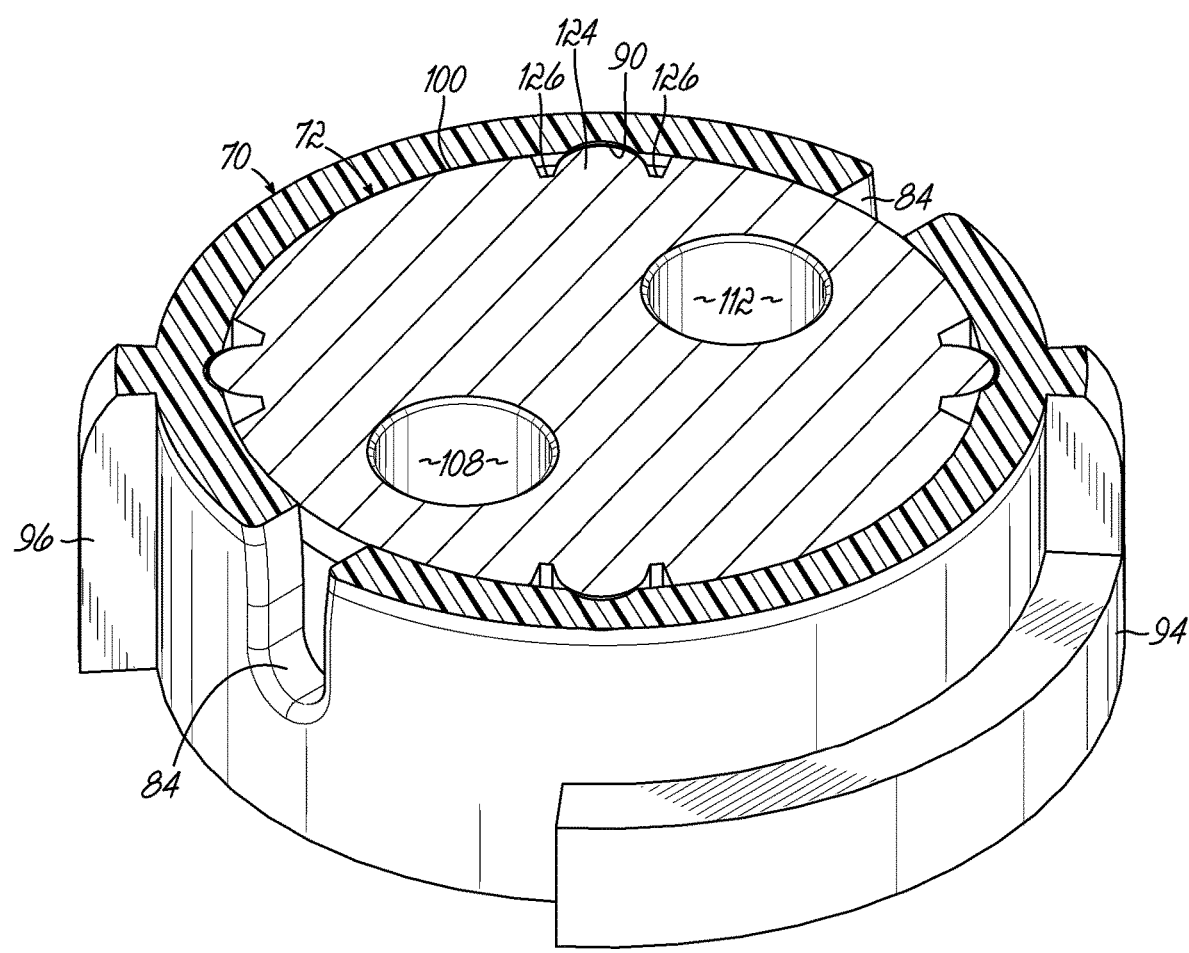
FIG. 4 is a perspective cross-sectional view of the adapter of FIG. 1, taken along line 4-4 in FIG. 3A, during assembly of the connecting portion with the locking portion.

Referring to FIGS. 2-4, the exemplary adapter 16 connects the single-inlet mixer 14 to the separated-outlet fluid cartridge 12, and includes a locking nut 70 and a separately formed connecting disc 72 removably received within the locking nut 70. While the adapter 16 is shown herein in use with static mixer 14 and fluid cartridge 12, each having specific structural features, it will be appreciated that the adapter 16 may be suitably modified for use with single-inlet mixers and separated-outlet cartridges of various alternative types, without departing from the invention.

The locking nut 70 is generally annular in shape and includes a proximal base portion 74 defining a proximal opening 76 and at least one locking element for locking the adapter 16 to the static mixer 14, and shown in the form of first and second locking jaws 78, 80. The first and second locking jaws 78, 80 extend distally from the base portion 74 to define a distal opening 82 of the locking nut 70, and are arranged generally opposite of one another and separated by circumferential gaps 84. The locking jaws 78, 80 may flare radially outward from the base portion 74, and each locking jaw 78, 80 includes a circumferentially extending slot 86 and a lip 88 that overhangs the slot 86.

The circumferential slots 86 in the locking jaws 78, 80 are sized and shaped to receive the bayonet lugs 58, 60 formed on the mixer flange 52, so that the static mixer 14 may lockingly connect to the locking nut 70 with a snap fit engagement in which the mixer bayonet lugs 58, 60 project through the circumferential slots 86. In that regard, each of the circumferential slots 86 may be formed with one or more notches or recesses for accommodating correspondingly shaped features projecting from the mixer bayonet lugs 58, 60. As described below, the locking jaws 78, 80 retain the mixer flange 52 so as to substantially inhibit rotation between the mixer housing 48 and the locking nut 70. Moreover, the circumferential gaps 84 between the locking jaws 78, 80 may be suitably sized, and the locking nut 70 may be formed of a suitably elastic and resilient material, to allow the locking jaws 78, 80 to flex radially outward when engaging the mixer flange 52. Further, the lip 88 of each locking jaw 78, 80 may be tapered at a radially inner surface, thereby providing the distal opening 82 with a funnel-like shape for facilitating alignment and snap fit of the mixer flange 52 within the locking jaws 78, 80.

As best shown in FIGS. 2-3B, the interior of the locking nut 70 may include one or more axial grooves 90 extending distally from the proximal base portion 74 for facilitating alignment of the connecting disc 72 with the locking nut 70 during assembly, as described below. In the exemplary embodiment of FIGS. 1-4 the locking nut 70 includes four axial grooves 90 arranged at uniform circumferential spacings, but it will be understood that alternative quantities and arrangements of axial grooves 90 or other alignment features may be provided.

The interior of the locking nut 70 may further include an internal ledge 92 that extends radially inward toward and circumferentially about the connecting disc 72. As described below, the internal ledge 92 substantially inhibits proximal movement of the connecting disc 72 relative to the locking nut 70 following assembly. As shown, the internal ledge 92 may be formed proximally of the circumferential slots 86 of the locking jaws 78, 80, and the axial grooves 90 may extend through the internal ledge 92.

As shown best in FIGS. 2 and 4, the locking nut 70 may further include first and second L-shaped bayonet lugs 94, 96 for releasably locking the locking nut 70 to the cartridge 12. The bayonet lugs 94, 96 extend radially outward from generally opposite sides of the proximal base portion 74, and are sized to be received within the locking channels 44, 46 formed in the outlet socket 24 of the cartridge 12 when the locking nut 70 is rotated. As described below, the locking nut 70 is rotatable relative to the cartridge 12 between locked and unlocked positions.

Referring to FIGS. 2-4, the connecting disc 72 of the adapter 16 generally includes a radially extending disc flange 100, first and second fluid inlet members 102, 104 (also referred to as inlet "ports") extending proximally from a proximal side of the disc flange 100, and a single fluid outlet member 106 extending distally from a distal side of the disc flange 100. As shown best in FIGS. 3A and 3B, the fluid inlet members 102, 104 are spaced radially from one another and may be diametrically opposed about a central axis of the connecting disc 72. The first fluid inlet member 102 defines a first fluid inlet passage 108 and has a first outer sealing surface 110. Similarly, the second fluid inlet member 104 defines a second fluid inlet passage 112 and has a second outer sealing surface 114.

The fluid outlet member 106 of the connecting disc 72 includes a single outer sealing surface 116, and defines first and second fluid outlet passages 118, 120 separated by a dividing wall 122. The first fluid outlet passage 118 communicates with the first fluid inlet passage 108, and the second fluid outlet passage 120 communicates with the second fluid inlet passage 112. As shown in FIG. 2, the first and second fluid outlet passages 118, 120 may be formed with non-circular cross-sectional shapes, such as cat-eye shape, and the first and second fluid inlet passages 108, 112 may be formed with substantially circular cross-sectional shapes. Further, each of the fluid inlet and outlet members 102, 104, 106 of the connecting disc 72 may be substantially cylindrical in shape. However, it will be appreciated that the fluid inlet and outlet members 102, 104, 106 and corresponding fluid passages may be formed with various alternative shapes. Exemplary alternative configurations are described in greater detail below in connection with FIGS. 9-16.

The fluid outlet passages 118, 120 of the connecting disc 72 may be substantially equal in size for directing substantially equal volumes of respective first and second fluids from the first and second chamber portions 18a, 18b of the fluid cartridge 12 into the static mixer 14. In other words, the first and second fluid outlet passages 118, 120 may be equally sized to deliver a 1:1 volume ratio of first fluid to second fluid into the static mixer 14. In alternative embodiments, features of the connecting disc 72, including the fluid outlet passages 118, 120, may be differently sized to deliver alternative ratios of first fluid to second fluid into the static mixer 14, such as described below in connection with FIGS. 13-16, for example.

As shown best in FIGS. 2 and 4, the connecting disc 72 may include one or more protrusions 124 extending radially outward from an outer edge of the disc flange 100. Each radial protrusion 124 is sized to seat within one of the axial grooves 90 formed on the interior of the locking nut 70, for maintaining the connecting disc 72 in circumferential alignment with the locking nut 70 as the connecting disc 72 is pressed into the locking nut 70 through the proximal opening 76 during assembly. Accordingly, the radial protrusions 124 may be formed in quantity and circumferential arrangement similar to the axial grooves 90. As shown best in FIG. 4, relief depressions 126 may be formed at each circumferential side of each radial protrusion 124 for enabling the radial protrusions 124 to flex relative to the disc flange 100 during assembly.

Having described various features of the dispensing assembly 10 of FIGS. 1-4, including adapter 16, a related exemplary method of assembly will now be described. As described above, the adapter 16 may first be assembled with the single-inlet static mixer 14, which assembly may then be shipped to a user who later attaches the adapter 16 to a separated-outlet cartridge 12 for dispensing with the static mixer 14. Accordingly, and advantageously, the adapter 16 enables use of a single-inlet mixer with a separated-outlet cartridge, when combined use of such dispensing components is otherwise generally unachievable.

First, the proximal flange 52 of the static mixer 14 is aligned coaxially with the distal opening 82 of the locking nut 70, and the bayonet lugs 58, 60 on the mixer flange 52 are aligned circumferentially with the circumferential slots 86 in the locking jaws 78, 80. The mixer flange 52 is then pressed through the distal opening 82, against the lips 88, thereby causing the first and second locking jaws 78, 80 to flex radially outward until the bayonet lugs 58, 60 snap into the circumferential slots 86, at which point the locking jaws 78, 80 may at least partially return toward their relaxed positions. Advantageously, the locking engagement of the static mixer 14 with the locking nut 70 substantially inhibits axial and rotational movement of the static mixer 14 relative to the locking nut 70.

Subsequently to, prior to, or concurrently with the snap engagement of the locking nut 70 to the mixer 14, the connecting disc 72 is aligned coaxially with the proximal opening 76 of the locking nut 70 such that the fluid outlet member 106 faces distally, and the radial protrusions 124 are aligned circumferentially with the axial grooves 90. As shown in FIGS. 3A-4, the connecting disc 72 is pressed distally through the locking nut 70. The connecting disc flange 100 may be sized so as to engage the inner face of the adapter 16 with an interference fit. As shown in FIG. 3B, the connecting disc 72 is advanced distally until a distal side of the connecting disc flange 100 confronts the mixer flange 52 and a proximal side of the connecting disc flange 100 confronts the internal ledge 92 of the locking nut 70. In this position, the fluid outlet member 106 is received within the fluid inlet 62 of the static mixer 14 such that the outer sealing surface 116 of the fluid outlet member 106 sealingly engages the inner sealing surface 66 of the static mixer 14, thereby forming a liquid-tight seal. The fluid inlet members 102, 104 of the connecting disc 72 are accessible through the proximal opening 76 of the locking nut 70.

Particularly in embodiments in which the connecting disc 72 is fully positioned within the locking nut 70 prior to introducing the static mixer 14, it will be appreciated that the connecting disc 72 is movable distally through the locking nut 70 toward the distal opening 82 without obstruction. In other words, the connecting disc 72 may be passed distally through the distal opening 82 of the locking nut 70, if desired.

Following assembly of the single-inlet static mixer 14 with the adapter 16, the mixer-adapter assembly may be connected to the separated-outlet cartridge 12. In particular, the proximal end of the locking nut 70 is aligned coaxially with the cartridge outlet socket 24, and circumferentially such that the locking nut bayonet lugs 94, 96 are positioned between the first and second fingers 40, 42 of the cartridge 12. The adapter 16 and static mixer 14 are pressed proximally toward the cartridge 12 so that the first and second fluid outlet members 28, 30 of the cartridge 12 are received through the proximal opening 76 of the locking nut 70 and sealingly engage the first and second fluid inlet members 102, 104 of the connecting disc 72. For example, the first and second fluid inlet members 102, 104 may be received within the respective first and second fluid outlet members 28, 30, such that the first and second outer sealing surfaces 110, 114 on the connecting disc 72 sealingly engage the first and second inner sealing surfaces 34, 38, respectively, on the cartridge 12.

The adapter 16 is pressed proximally against the cartridge 12 until the proximal end of the locking nut 70 confronts the landing surface 26 and the fluid inlet members 102, 104 of the connecting disc 72 are fully engaged with the fluid outlet members 28, 30 of the cartridge 12, thereby positioning the adapter 16 in an unlocked position relative to the cartridge 12. In the unlocked position of the adapter 16, the connecting disc 72 is non-rotatably mounted to the cartridge 12 via engagement of the fluid inlet members 102, 104 with the fluid outlet members 28, 30. The locking nut 70 and static mixer 14 remain rotatable relative to the connecting disc 72 and the cartridge 12. Accordingly, the locking nut 70 and static mixer 14 may be rotated together about a central axis of the connecting disc 72 into a locked position in which the locking nut bayonet lugs 94, 96 are received within the locking channels 44, 46 of the cartridge outlet socket 24, as shown in FIG. 1. With reference to FIG. 3B, it will be appreciated that during rotation of the adapter 16 between the unlocked and locked positions, the outer sealing surface 116 of the single fluid outlet member 106 of the connecting disc 72 moves relative to and remains sealingly engaged with the inner sealing surface 66 of the fluid inlet 62 of the static mixer 14.

Following dispensing operations, the adapter 16 and static mixer 14 may be disassembled from the cartridge 12. In particular, the adapter 16 and static mixer 14 are rotated together relative to the cartridge 12 back into the unlocked position in which the locking nut bayonet lugs 94, 96 are disengaged from the locking channels 44, 46 of the cartridge outlet socket 24. During this rotation, the connecting disc 72 of the adapter 16 remains non-rotatably mounted to the cartridge 12. In the unlocked position of the adapter 16, the proximal side of the connecting disc flange 100 confronts the internal ledge 92 of the locking nut 70. Accordingly, the locking nut 70 and static mixer 14 may be pulled distally away from the cartridge 12, which movement causes the internal ledge 92 to contact the disc flange 100 at its proximal side and thereby simultaneously pull the connecting disc 72 away from the cartridge 12. In this manner, removal of the locking nut 70 from the cartridge 12 advantageously also removes the connecting disc 72 from the cartridge 12, such that the cartridge 12 may be freely capped for storage or otherwise assembled with other mixing components, for example.

Referring to FIGS. 5-8, a dispensing assembly 210 according to another exemplary embodiment of the invention is shown. The dispensing assembly 210 includes a separated-outlet cartridge 12, a single-inlet static mixer 14, and an adapter 216 that releasably couples the static mixer 14 to the cartridge 12. Unlike the independently formed locking nut 70 and connecting disc 72 of adapter 16, the locking nut 270 and connecting disc 272 of adapter 216 are integrally formed with frangible connections, as described in greater detail below. Adapter 216 is otherwise largely similar in function and construction to adapter 16 of FIGS. 1-4, as indicated by use of similar reference numerals.

Figure 7A:
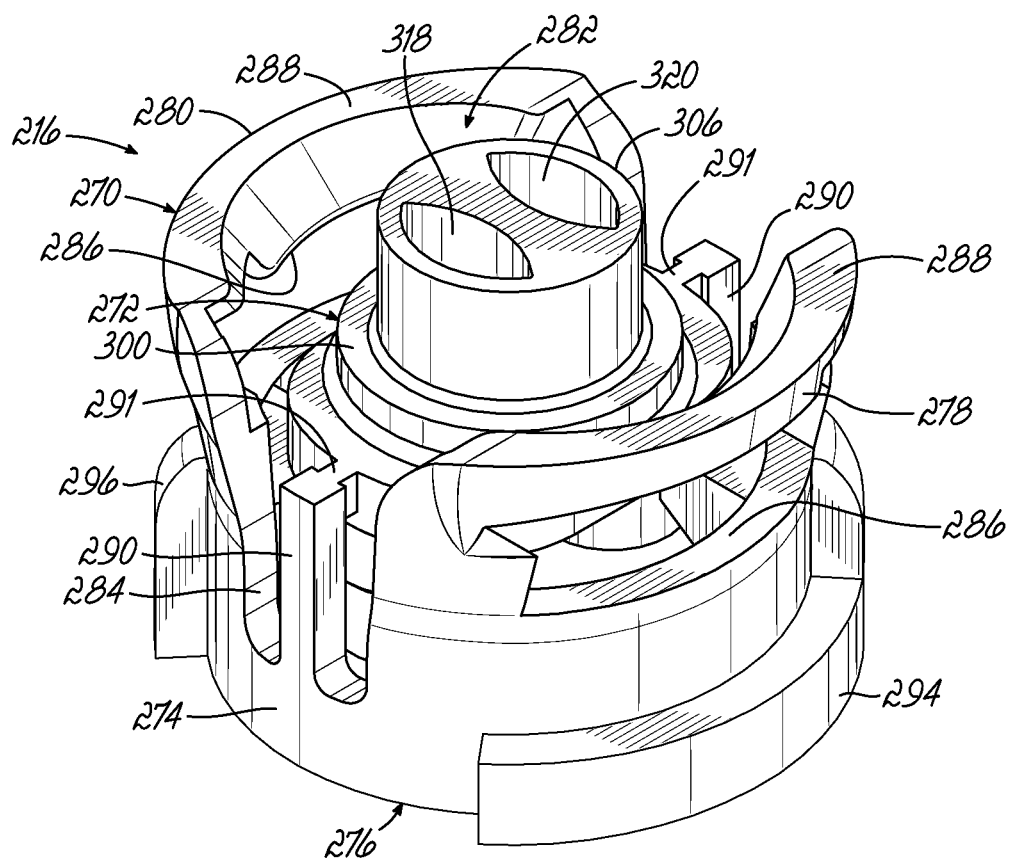
FIG. 7A is an enlarged perspective view of the adapter of FIG. 5, showing details of a locking portion and a connecting portion frangibly connected to the locking portion.
Figure 7B:
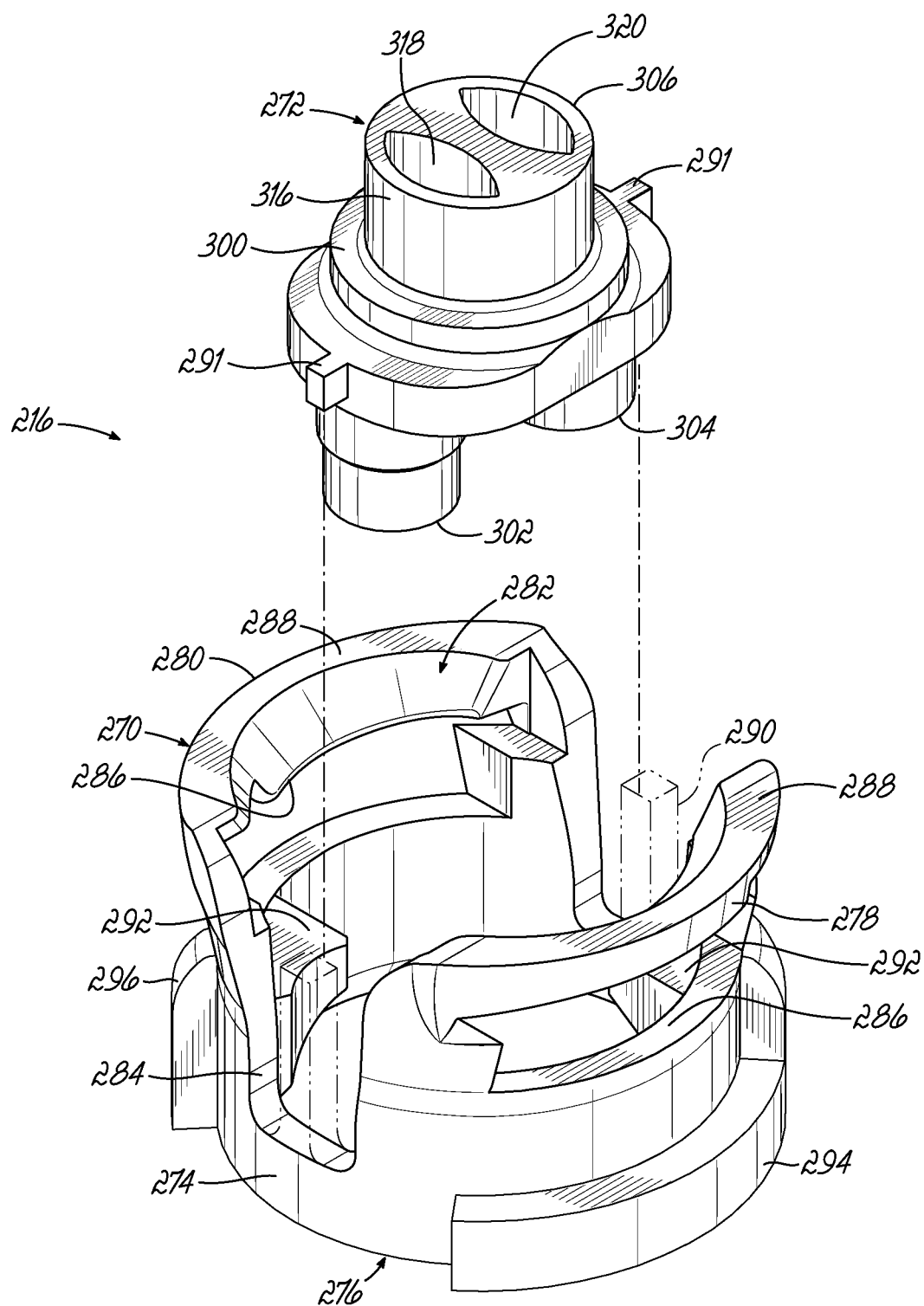
FIG. 7B is a perspective view similar to FIG. 7A, with the connecting portion shown artificially displaced from the locking portion, and support arms supporting the frangible connections shown in phantom, to reveal interior details of the locking portion.

As shown best in FIGS. 7A and 7B, locking nut 270 of adapter 216 includes a proximal base portion 274 defining a proximal opening 276, and first and second locking jaws 278, 280 extending distally from the base portion 274 and defining a distal opening 282. Each locking jaw 278, 280 includes a circumferentially extending slot 286 and a lip 288 that overhangs the slot 286. The circumferential slots 286 are sized and shaped to receive the bayonet lugs 58, 60 formed on the mixer flange 52, and thus may be formed with a variety of geometries, such as the exemplary geometry shown.

A pair of support arms 290 extend distally from the base portion 274 of the locking nut 270, through the circumferential gaps 284 formed between the first and second locking jaws 278, 280. Each support arm 290 supports a frangible connection 291 that connects the connecting disc 272 to the locking nut 270. The frangible connections 291 are shown intact in FIGS. 7A and 8, prior to the adapter 216 being first rotated from the unlocked position into the locked position relative to the cartridge 12. As described below, upon a first rotation of the locking nut 270 into the locked position, the frangible connections 291 are broken. While FIG. 7B shows the connecting disc 272 artificially displaced from the locking nut 270 to reveal interior details of the locking nut 270, this view illustrates the general location at which the frangible connections 291 break upon the first rotation of the locking nut 270.

Figure 5:
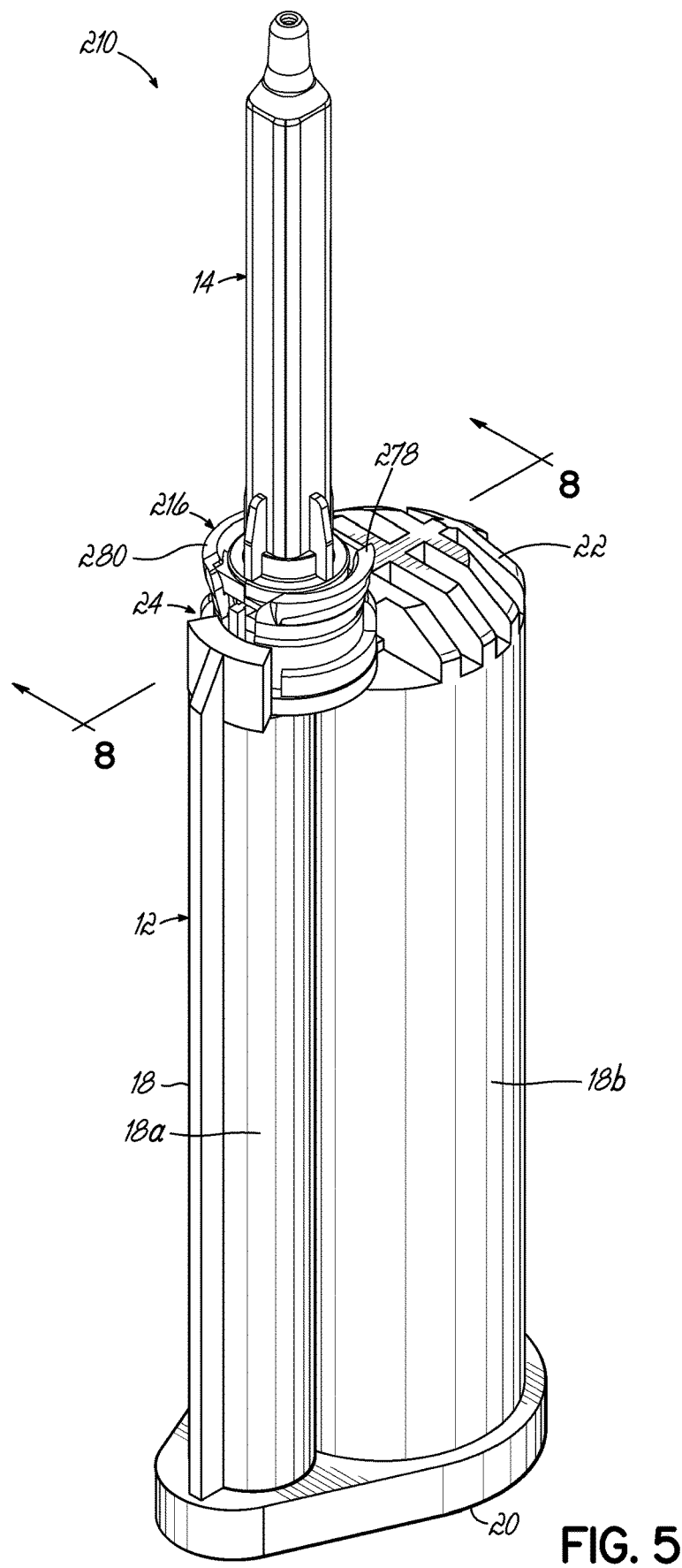
FIG. 5 is a perspective view of a dispensing assembly having an adapter according to another exemplary embodiment of the invention.
Figure 6:
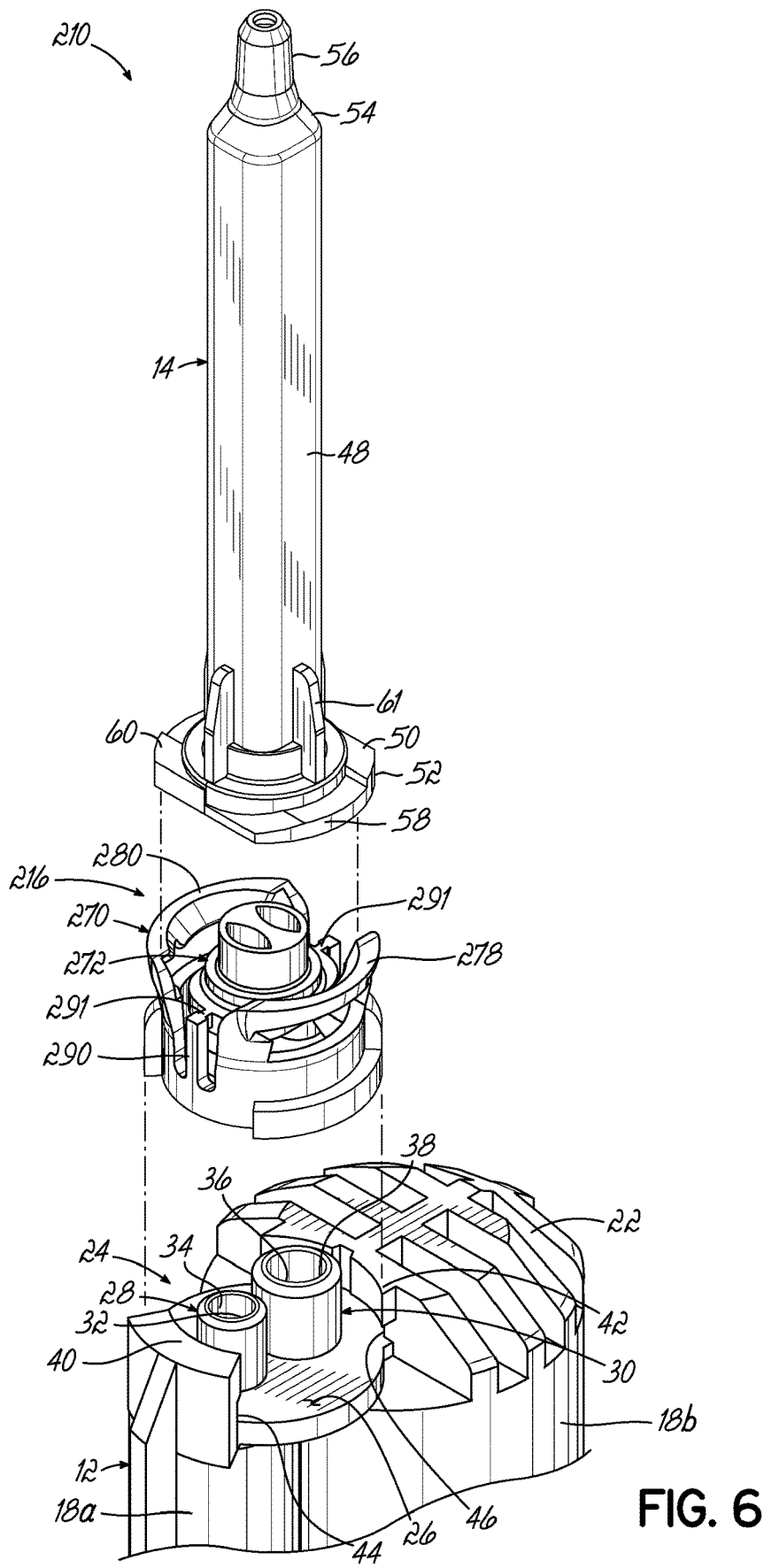
FIG. 6 is a perspective view of the dispensing assembly of FIG. 5, shown disassembled.

As shown best in FIG. 7B, the interior of the locking nut 270 further includes a pair of internal ledges 292 extending radially inward from the first and second locking jaws 278, 280, toward the connecting disc 272 (shown displaced distally). The internal ledges 292 may be diametrically opposed from one another, for example at positions adjacent to the circumferential gaps 284, and are positioned to confront a proximal side of the connecting disc 272 when the adapter 216 is in the unlocked position relative to the cartridge 12, as shown in FIG. 5. While the first and second internal ledges 292 are shown as separate elements, it will be appreciated that various alternative configurations of the internal ledges 292 may be provided.

Connecting disc 272 of adapter 216 includes a radially extending disc flange 300, first and second fluid inlet members 302, 304 extending proximally from a proximal side of the disc flange 300, and a single fluid outlet member 306 extending distally from a distal side of the disc flange 300. The disc flange 300 may be formed with one or more flattened or recessed sides (see, e.g., FIGS. 9-16), or an otherwise non-circular shape, for accommodating mold support structure (not shown) positioned between the locking nut 270 and the connecting disc 272 during formation of the adapter 216.

Figure 8:
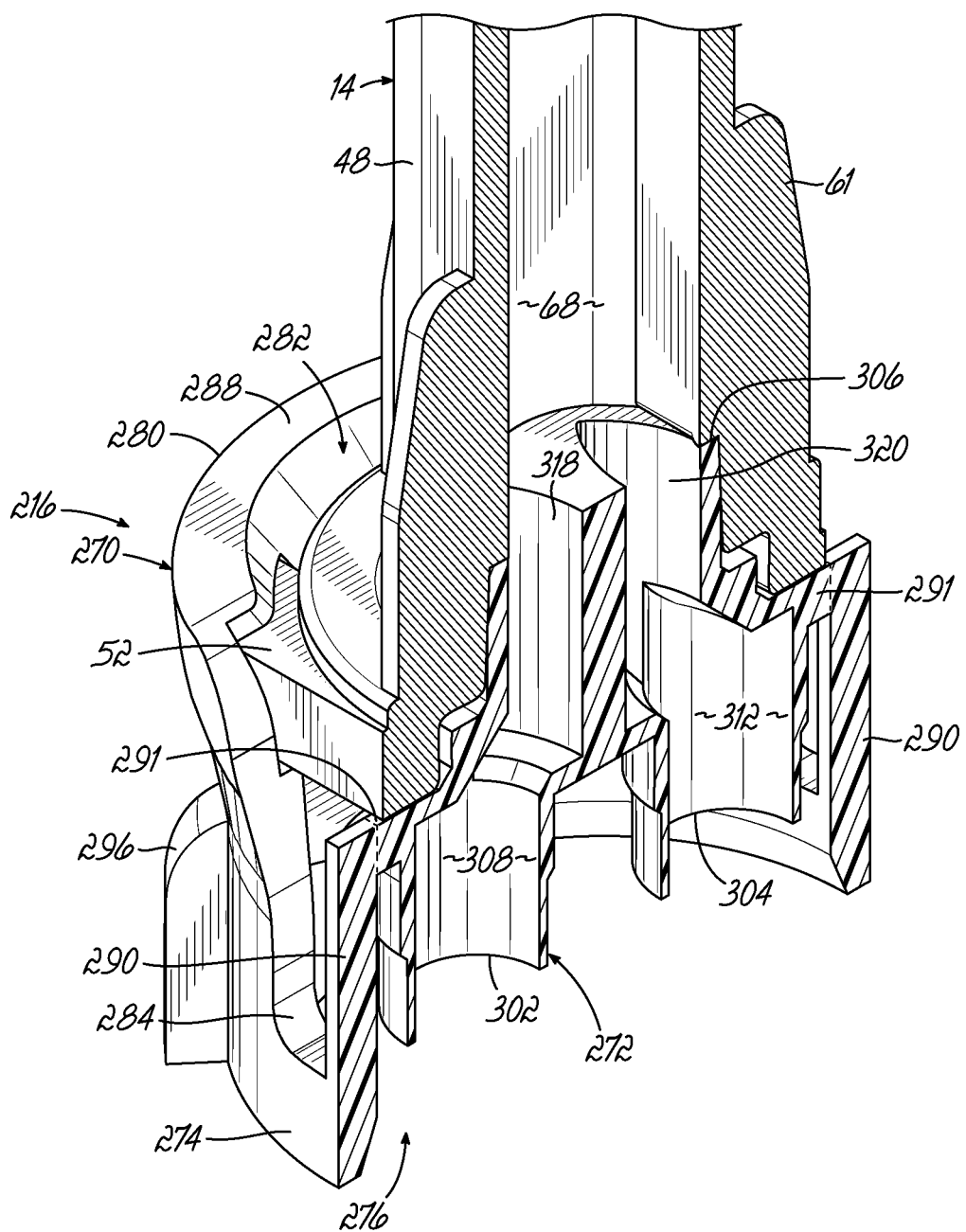
FIG. 8 is a perspective cross-sectional view of the adapter and mixer of FIG. 5, taken along line 8-8, showing the adapter fully engaged with the mixer and with the frangible connections intact.

An exemplary method of assembling dispensing assembly 210 will now be described. The proximal flange 52 of the static mixer 14 is aligned coaxially with the distal opening 282 of the locking nut 270, and the bayonet lugs 58, 60 on the mixer flange 52 are aligned circumferentially with the circumferential slots 286 in the locking jaws 278, 280. The mixer flange 52 is then pressed proximally through the distal opening 282 until the mixer bayonet lugs 58, 60 snap into the circumferential slots 286, in a manner similar to that described above in connection with adapter 16. Simultaneously, because the connecting disc 272 is already connected to the locking nut 270 via frangible connections 291, the fluid outlet member 306 of the connecting disc 272 is received within and sealingly engages the fluid inlet 62 of the static mixer 14, as shown in FIG. 8. In this configuration, the mixer housing 48 is non-rotatably mounted to the locking nut 270.

The assembled static mixer 14 and adapter 216 are then aligned with and coupled to the separated-outlet cartridge 12 in a manner similar to that described above for adapter 216. In the unlocked position, the connecting disc 272 is non-rotatably mounted to the cartridge 12. As the adapter 216 is rotated for the first time from the unlocked position (FIG. 6) toward the locked position (FIG. 5), the locking nut 270 rotates about the connecting disc 272, thereby breaking the frangible connections 291 so that the locking nut 270 and connecting disc 272 are no longer integral.

During disassembly following dispensing operations, the adapter 216 is rotated from the locked position back to the unlocked position with respect to the cartridge 12. In the unlocked position, the internal ledges 292 of the locking nut 270 are positioned proximally of and confront a proximal side of the disc flange 300. As the locking nut 270 and static mixer 14 are pulled proximally away from the cartridge 12, simultaneously the internal ledges 292 contact and pull the connecting disc 272 away from the cartridge 12, such that the cartridge 12 may be freely capped for storage or otherwise assembled with other mixing components, for example.

Referring to FIGS. 9-16, alternative exemplary embodiments of connecting discs are shown. These connecting discs are largely similar to connecting disc 272 of FIGS. 5-8, as indicated by use of similar reference numerals. However, it will be appreciated that the features of these alternative connecting discs may also be applied to connecting disc 72 of adapter 16 to generate further alternative embodiments. The following descriptions emphasize the unique features of the exemplary connecting discs of FIGS. 9-16, which relate primarily to the internal geometrics of the corresponding fluid outlet members.

Figure 9:
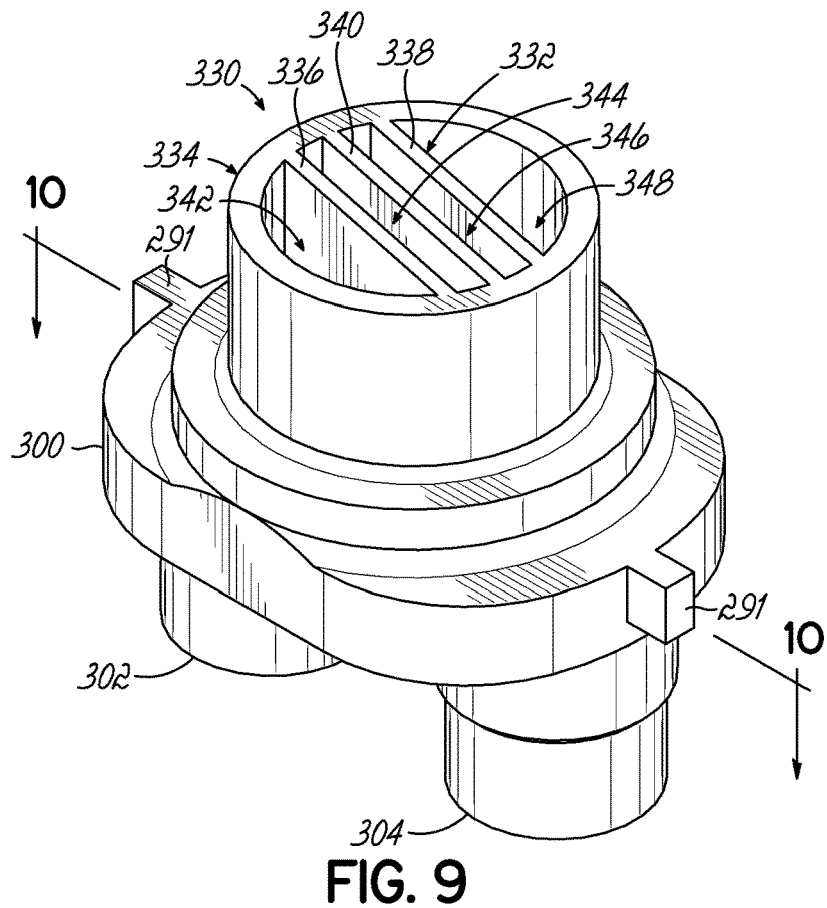
FIG. 9 is a perspective view of a connecting portion according to another exemplary embodiment of the invention.
Figure 10:
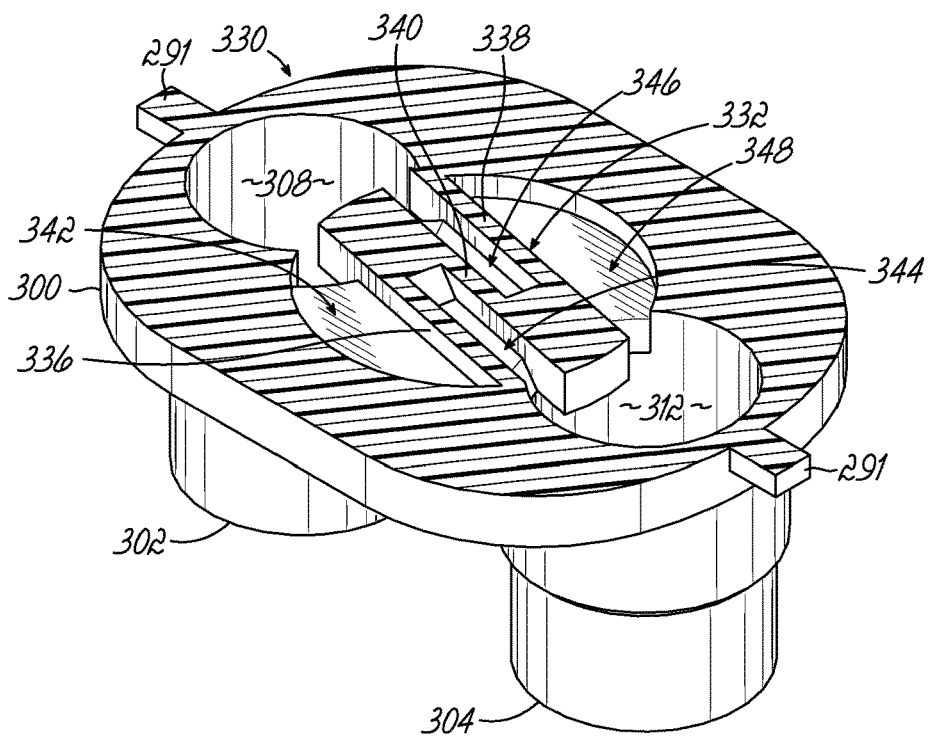
FIG. 10 is a perspective cross-sectional view of the connecting portion of FIG. 9, taken along line 10-10.

Referring to FIGS. 9 and 10, exemplary connecting disc 330 includes a fluid layering element 332 arranged within the fluid outlet member 334. The fluid layering element 332 functions to provide an initial layering of first and second fluids directed through the fluid outlet member 334 as the fluids pass into the static mixer 14, thereby enhancing the mixing effect provided by the static mixer 14. The exemplary fluid layering element 332 is shown in the form of a plurality of axially extending planar walls formed integrally with the fluid outlet member 334, and defining a plurality of fluid layer passages through which fluid is directed. It will be appreciated that fluid layering elements having various alternative configurations may also be provided.

The exemplary fluid layering element 332 shown includes a first outer wall 336, a second outer wall 338, and an intermediate wall 340 extending between the first and second outer walls 336, 338. A first fluid layer passage 342 is defined between the first outer wall 336 and an inner face of the fluid outlet member 334. A second fluid layer passage 344 is defined between the first outer wall 336 and the intermediate wall 340. A third fluid layer passage 346 is defined between the intermediate wall 340 and the second outer wall 338. A fourth fluid layer passage 348 is defined between the second outer wall 338 and an inner face of the fluid outlet member 334, at a radial position substantially opposite that of the first fluid layer passage 342. The first and fourth fluid layer passages 342, 348 may each have a semi-circular cross-sectional shape, while the second and third fluid layer passages 344, 346 may each have a generally rectangular cross-sectional shape. As shown best in FIG. 10, the first fluid inlet passage 308 communicates with the first and third fluid layer passages 342, 346, and the second fluid inlet passage 312 communicates with the second and fourth fluid layer passages 344, 348.

Figure 11:
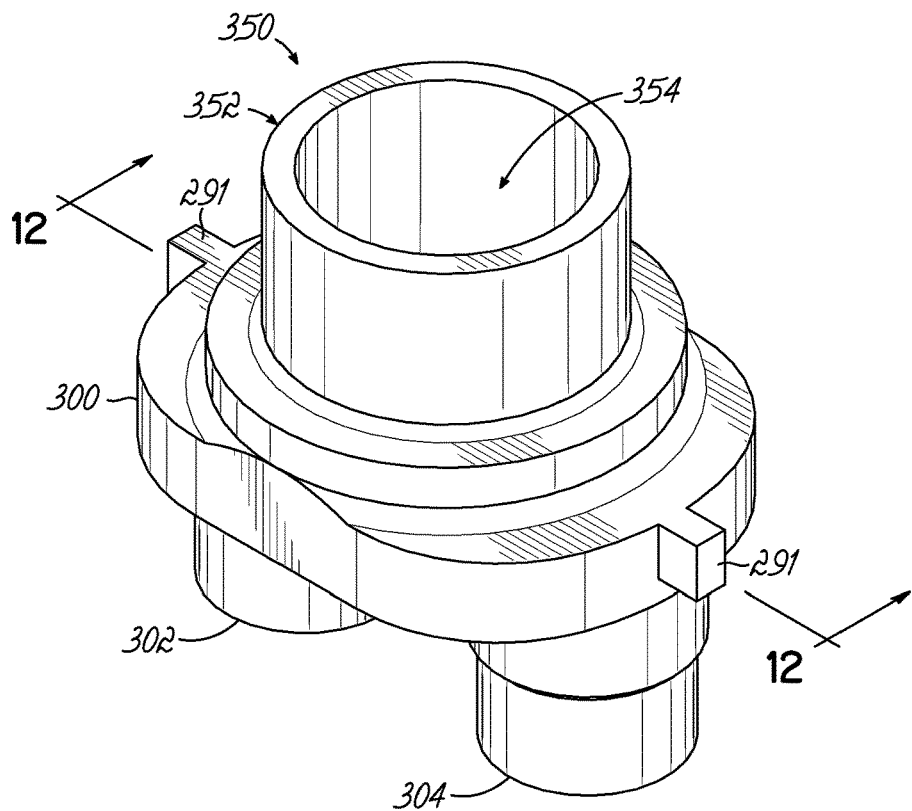
FIG. 11 is a perspective view of a connecting portion according to yet another exemplary embodiment of the invention.
Figure 12:
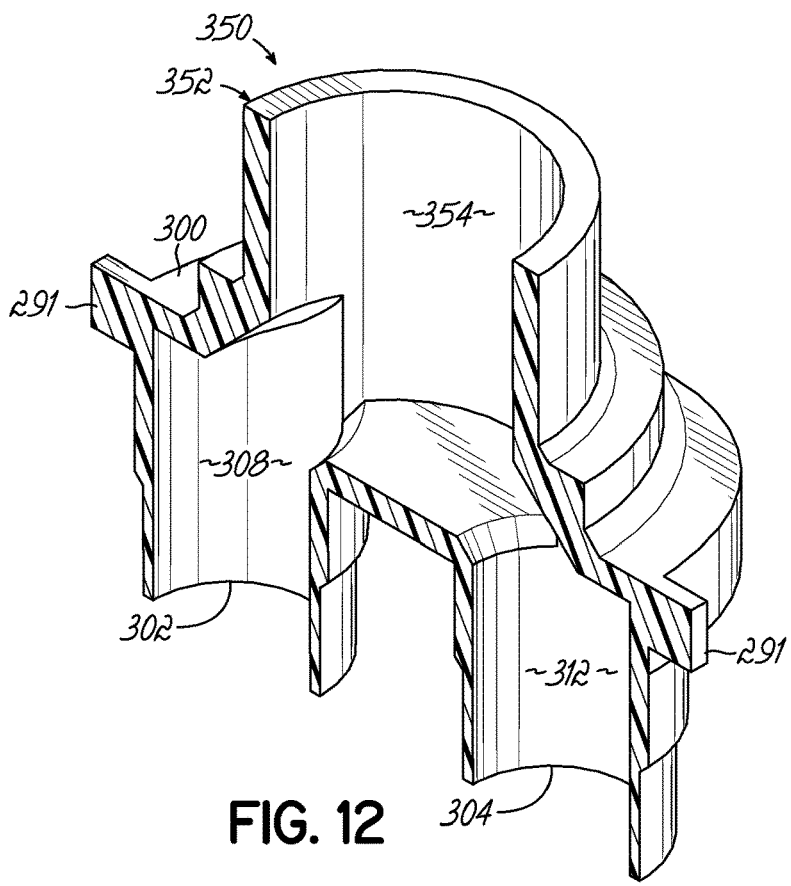
FIG. 12 is a perspective cross-sectional view of the connecting portion of FIG. 11, taken along line 12-12.

Referring to FIGS. 11 and 12, exemplary connecting disc 350 includes a fluid outlet member 352 defining a single fluid outlet passage 354 that communicates with the first fluid inlet passage 308 and also with the second fluid inlet passage 312.

Figure 13:
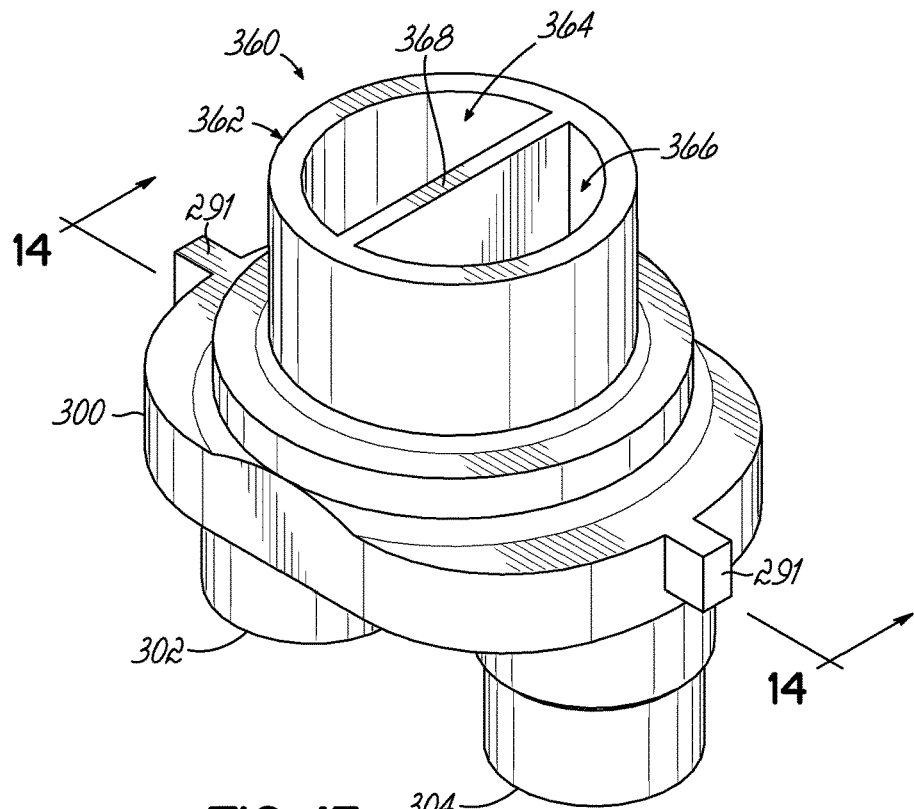
FIG. 13 is a perspective view of a connecting portion according to yet another exemplary embodiment of the invention.
Figure 14:
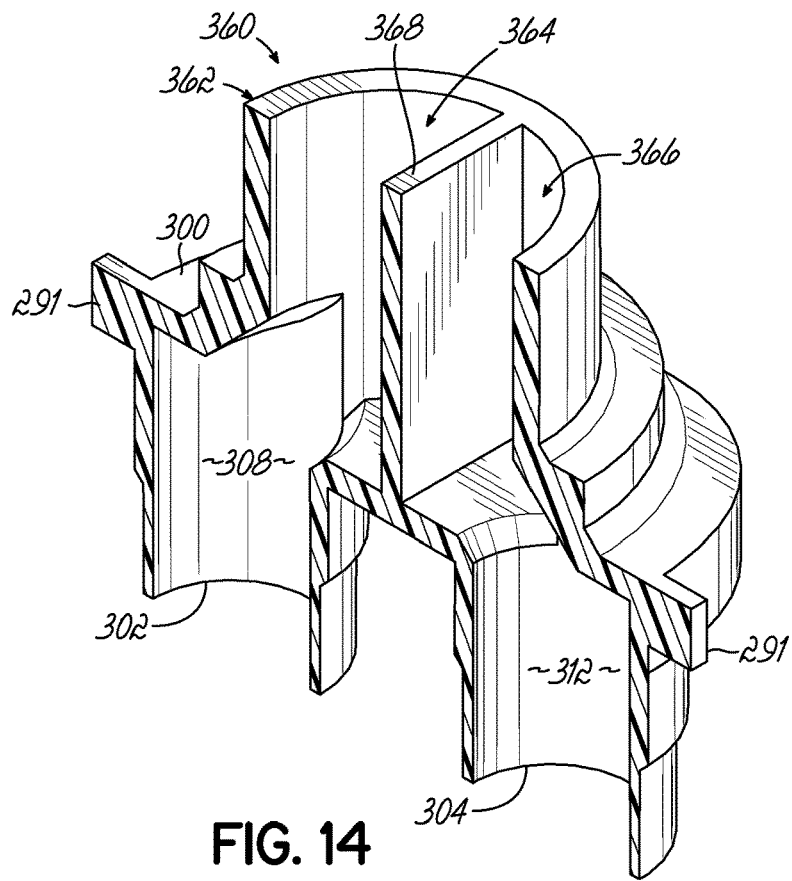
FIG. 14 is a perspective cross-sectional view of the connecting portion of FIG. 13, taken along line 14-14.

Referring to FIGS. 13 and 14, exemplary connecting disc 360 includes a fluid outlet member 362 having first and second fluid outlet passages 364, 366 defined by a dividing wall 368 extending axially through the fluid outlet member 362 from the disc flange 300. The dividing wall 368 may be positioned centrally within the fluid outlet member 362 so that the first and second fluid outlet passages 364, 366 are substantially equal in cross-sectional area so as to deliver a 1:1 volume ratio of first fluid to second fluid into the static mixer 14. It will be appreciated that the dividing wall 368 may be alternatively positioned at various radial distances from a central axis of the fluid outlet member 362, so as to define first and second fluid outlet passages of differing cross-sectional areas for delivering alternative ratios of first fluid to second fluid into the static mixer 14.

Figure 15:
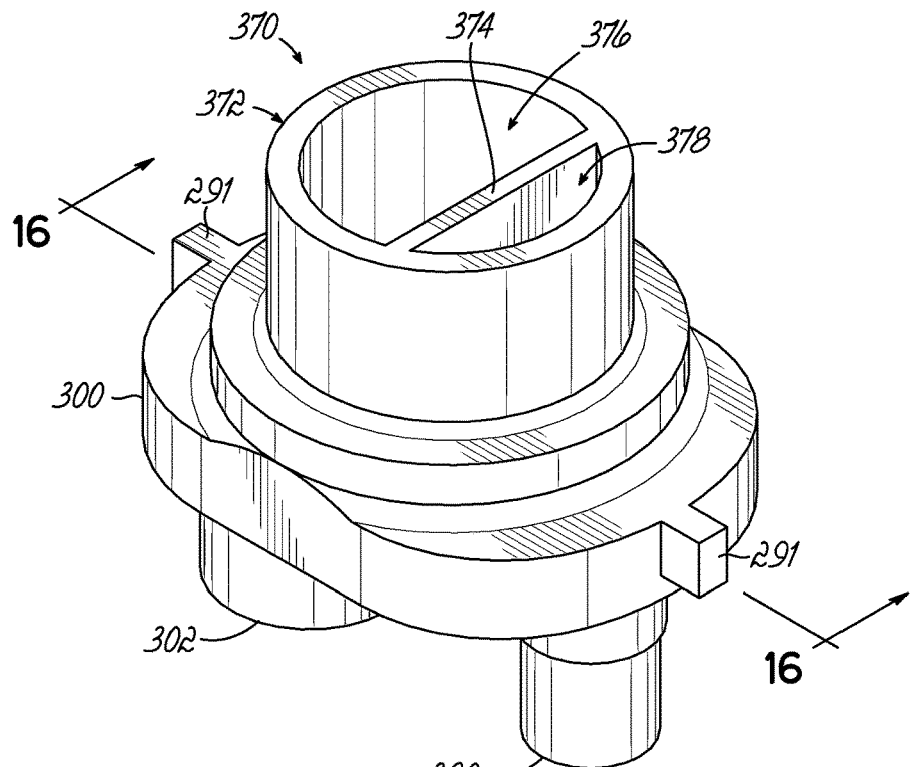
FIG. 15 is a perspective view of a connecting portion according to yet another exemplary embodiment of the invention.
Figure 16:
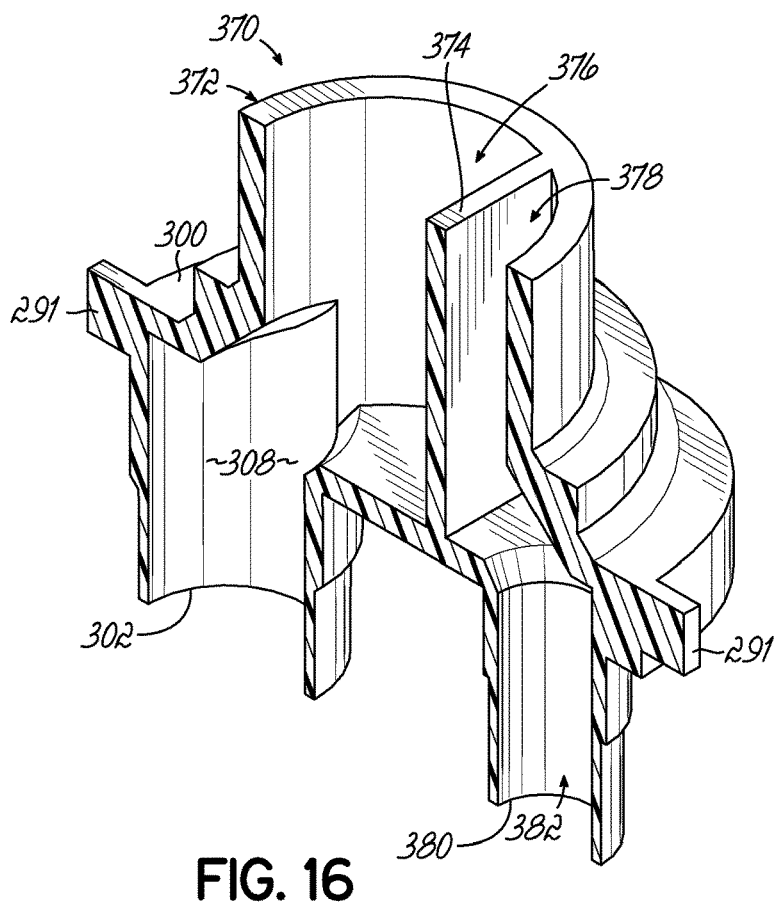
FIG. 16 is a perspective cross-sectional view of the connecting portion of FIG. 15, taken along line 16-16.

Referring to FIGS. 15 and 16, exemplary connecting disc 370 includes a fluid outlet member 372 having a dividing wall 374 that is radially offset from a central axis of the fluid outlet member 372, so as to define first and second fluid outlet passages 376, 378 of differing cross-sectional areas. More specifically, the dividing wall 374 may be positioned radially so that the cross-sectional area of the first fluid outlet passage 376 is approximately twice that of the second fluid outlet passage 378, for example, for delivering a 2:1 volume ratio of first fluid to second fluid into the static mixer 14. Similarly, as shown, a second fluid inlet member 380 of the connecting disc 370 may be sized smaller than the first fluid inlet member 302 for defining a corresponding second fluid inlet passage 382 having a smaller cross-sectional area than the first fluid inlet passage 308.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A method of assembling a dispensing assembly including a mixer and an adapter having a locking nut and a connecting disc that releasably couples to a cartridge and is configured to be moved away from the cartridge when the locking nut is in an unlocked position, the method comprising:

positioning a proximal end of the mixer within a distal opening of the locking nut;

lockingly engaging the mixer with the locking nut so as to inhibit rotation between the mixer and the locking nut;

arranging the connecting disc within the locking nut such that a fluid outlet member of the connecting disc extends toward the distal opening of the locking nut, and first and second fluid inlet members of the connecting disc extend toward a proximal opening of the locking nut;

sealingly engaging the fluid outlet member of the connecting disc with an inlet of the mixer;

sealingly engaging the first and second fluid inlet members of the connecting disc with first and second fluid outlets of a separated-outlet cartridge; and rotating the locking nut relative to the connecting disc into a locked position, in which the locking nut is lockingly engaged with the cartridge.

2. The method of claim 1, wherein the mixer includes a proximal end flange, and lockingly engaging the mixer with the locking nut includes engaging the flange with at least one locking element formed on the locking nut.

3. The method of claim 2, wherein the at least one locking element includes first and second jaws, and lockingly engaging the mixer with the locking nut includes snapping the flange into engagement with the first and second jaws.

4. The method of claim 3, wherein snapping the flange into engagement with the first and second jaws includes pressing the flange into the distal opening of the locking nut to cause the first and second jaws to flex radially outward.

5. The method of claim 2, wherein engaging the flange with the at least one locking element formed on the locking nut comprises coaxially aligning the flange with the distal opening of the locking nut.

6. The method of claim 1, wherein arranging the connecting disc within the locking nut comprising coaxially aligning the connecting disc with the proximal opening of the locking nut.

7. The method of claim 1, wherein the locking nut includes at least one internal ledge, the method further comprising:

rotating the locking nut relative to the connecting disc into an unlocked position in which the at least one internal ledge confronts a proximal side of the connecting disc; and moving the locking nut and the mixer away from the cartridge to cause the proximal side of the connecting disc to contact with the at least one internal ledge to pull the connecting disc away from the cartridge.

8. The method of claim 1, wherein rotating the locking nut into the locked position includes breaking a frangible connection between the connecting disc and the locking nut.

9. The method of claim 1, wherein sealingly engaging the first and second fluid inlet members of the connecting disc with the first and second fluid outlets of the separated-outlet cartridge comprises pressing the mixer and the adapter proximally towards the separated-outlet cartridge.

10. A method of assembling a dispensing assembly including a mixer and an adapter having a locking portion and a connecting portion, the method comprising:

positioning a proximal end of the mixer within a distal opening of the locking portion;

lockingly engaging the mixer with the locking portion so as to inhibit rotation between the mixer and the locking portion;

arranging the connecting portion within the locking portion such that a fluid outlet member of the connecting portion extends toward the distal opening of the locking portion, and first and second fluid inlet members of the connecting portion extend toward a proximal opening of the locking portion; and sealingly engaging the fluid outlet member of the connecting portion with an inlet of the mixer, wherein the mixer includes a proximal end flange, and lockingly engaging the mixer with the locking portion includes engaging the flange with at least one locking element formed on the locking portion;

wherein the at least one locking element includes first and second jaws, and lockingly engaging the mixer with the locking portion includes snapping the flange into engagement with the first and second jaws; and wherein snapping the flange into engagement with the first and second jaws includes pressing the flange into the distal opening of the locking portion to cause the first and second jaws to flex radially outward.

11. The method of claim 10, wherein engaging the flange with the at least one locking element formed on the locking portion comprises coaxially aligning the flange with the distal opening of the locking portion.

12. The method of claim 10, wherein arranging the connecting portion within the locking portion comprising coaxially aligning the connecting portion with the proximal opening of the locking portion.

13. The method of claim 10, further comprising:
sealingly engaging the first and second fluid inlet members of the connecting portion with first and second fluid outlets of a separated-outlet cartridge.

14. The method of claim 13, further comprising:
rotating the locking portion relative to the connecting portion into a locked position in which the locking portion is lockingly engaged with the cartridge.

15. The method of claim 14, wherein the locking portion includes at least one internal ledge, the method further comprising:

rotating the locking portion relative to the connecting portion into an unlocked position in which the at least one internal ledge confronts a proximal side of the connecting portion; and moving the locking portion and the mixer away from the cartridge to cause the proximal side of the connecting portion to contact with the at least one internal ledge to pull the connecting portion away from the cartridge.

16. The method of claim 14, wherein rotating the locking portion into the locked position includes breaking a frangible connection between the connecting portion and the locking portion.

17. The method of claim 13, wherein sealingly engaging the first and second fluid inlet members of the connecting portion with the first and second fluid outlets of the separated-outlet cartridge comprises pressing the mixer and the adapter proximally towards the separated-outlet cartridge.

* * * * *